United States Patent [19]
Takahashi

[11] Patent Number: 6,072,763
[45] Date of Patent: Jun. 6, 2000

[54] OPTICAL HEAD DEVICE HAVING A PINHOLE MEMBER FOR REMOVING WAVEFRONT ABERRATION

[75] Inventor: Junichi Takahashi, Tokyo, Japan

[73] Assignee: NEC Corporation, Tokyo, Japan

[21] Appl. No.: 08/958,156

[22] Filed: Oct. 27, 1997

[30] Foreign Application Priority Data

Oct. 28, 1996 [JP] Japan ................................. 8-285481

[51] Int. Cl.$^7$ ................................................. G11B 7/135
[52] U.S. Cl. ................... 369/118; 369/44.24; 369/44.23; 369/112
[58] Field of Search ....................... 369/118, 112, 369/44.23, 44.38, 94, 58, 109, 120, 44.14, 44.24, 117, 116

[56] References Cited

U.S. PATENT DOCUMENTS

| | | | |
|---|---|---|---|
| 5,526,338 | 6/1996 | Hasman et al. | 369/109 |
| 5,557,598 | 9/1996 | Oono et al. | 369/112 |
| 5,612,942 | 3/1997 | Takahashi | 369/112 |
| 5,708,638 | 1/1998 | Braat et al. | 369/112 |
| 5,724,334 | 3/1998 | Ohba et al. | 369/112 |
| 5,785,651 | 7/1998 | Kuhn et al. | 600/310 |

FOREIGN PATENT DOCUMENTS

| | | |
|---|---|---|
| 3-166530 | 7/1991 | Japan . |
| 6-11667 | 1/1994 | Japan . |
| 7-72386 | 3/1995 | Japan . |
| 8-212580 | 8/1996 | Japan . |

OTHER PUBLICATIONS

O. Nakamura, Lecture on Ultra–Resolution, *The Spectro Scopical Society of Japan*, 1994.

Principles of Optics, Sixth Edition, Max Born & Emil Wolf, Eds., pp. 197–202.

Yoshiaki Komma et al., "Dual Focus Optical Head with a Hologram–Integrated Lens", *1996 Technical Digest Series*, vol. 12, Jul., 1996, pp. 314–316.

Man–Hyung Lee et al, "Liquid Crystal Shutter–Optical Head for DVD Player with CD Compatibility", *1996 Technical Digest Series*, vol. 12, Jul., 1996, pp. 317–319.

Seiji Kajiyama et al., "DVD/CD Compatible Pick–Up Using Liquid Crystal Shutter", *1996 Technical Digest Series*, vol. 12, Jul., 1996, pp. 320–322.

Ryuichi Katayama et al., "Dual Wavelength Optical Head for 0.6 mm and 1.2 mm Substrate Thickness", *1996 Technical Digest Series*, vol. 12, Jul., 1996, pp. 323–325.

Fumisada Maeda et al., "High density optical disk system using a new two–element lens and a thin substrate disk", *1996 Technical Digest Series*, vol. 12, Jul., 1996, pp. 342–347.

Chul Woo Lee et al., "A Compact Disc Compatible Digital Video Disc Pickup Using Annular Mask", *1996 Technical Digest Series*, vol. 12, Jul., 1996, pp. 348–350.

"Micro–Optics Handbook," vol. 5, Jun. 25, 1995, p. 625.

*Primary Examiner*—Ali Neyzari
*Assistant Examiner*—Kim-Kwok Chu
*Attorney, Agent, or Firm*—Sughrue, Mion, Zinn, Macpeak & Seas, PLLC

[57] ABSTRACT

Disclosed is an optical head device for projecting a laser spot on an optical disk and reading out recorded information by detecting a recording state recorded on a recording surface of the optical disk, which has: a collimator lens which converges divergent light emitted from a semiconductor laser; and a pinhole member which removes a wavefront aberration at an outline portion of the light converged by the collimator lens; wherein the collimator lens and the pinhole member are disposed in an image-forming optical system, where a microspot is produced, from the semiconductor laser as a light source to an objective lens, and a wavefront aberration of the semiconductor laser is removed to minimize a wavefront aberration of the image-forming optical system.

3 Claims, 4 Drawing Sheets

OPTICAL HEAD DEVICE HAVING A PINHOLE MEMBER FOR REMOVING WAVEFRONT ABERRATION

FIELD OF THE INVENTION

This invention relates to an optical head device used in an optical recording and reproducing device, and more particularly to, an optical head device where an objective lens with a high numerical aperture(NA) is used to reproduce information from a high-density optical disk.

BACKGROUND OF THE INVENTION

The use of optical memory techniques with high-density and high-capacity optical disks is extending to a digital audio disk, video disk and data file, where, for example, a digital video disk with a density and capacity seven times or more that of a conventional optical recording medium has been developed.

In the optical memory techniques, a high-performance optical system technique in optical head device is required to conduct the recording and reproducing of information with a high reliability through a light beam converged to the order of micrometer.

An optical head device where optical system techniques are integrated has three basic functions, i.e., a convergent function to form a microspot at diffraction limit, a function to control the focusing of a microspot by its optical system and detect a pit signal, and a function to control the tracking of a microspot by its optical system.

These functions are achieved by using various combinations of optical system and photoelectric conversion detection system depending upon the object and use.

Next, a conventional optical head device will be explained in FIG. 1.

The optical head device is composed of a semiconductor laser 9, a diffraction grating 11, a beam splitter 12a, an objective lens 10 and a photodetector 13. A microspot is formed on an optical disk 8 by projecting a light beam and reflected light is used as an information reproducing signal.

In operation, light emitted from the semiconductor laser 9 is transmitted through the diffraction grating 11, forming three beams to detect a tracking error signal, then reflected by the beam splitter 12a, converged by the objective lens 10. Light reflected on the signal surface of the optical disk 8 is supplied through the objective lens 10 and beam splitter 12a to the light-receiving surface of the photodetector 13, converted into an electric signal, thereby obtaining an information signal.

Conventionally, the focusing error signal detection for controlling the microspot to follow the plane pitching of the optical disk 8 is conducted by again supplying light reflected on the optical disk 8 to the objective lens 10, then producing astigmatism at, e.g., the beam splitter 12a, supplying it to the photodetector 13. When the microspot projected onto the optical disk 8 is out of a focal position, an error signal according to the amount of the plane pitching of the optical disk 8 is obtained. Thus, a control signal for canceling the error signal can be applied to a lens actuator (not shown) to control the microspot to be on the focal position.

The tracking error signal detection for controlling the microspot to follow the eccentricity of the optical disk 8 is conducted by projecting three beams produced by the diffraction grating 11 onto the optical disk 8, setting the rotation position of the diffraction grating 11 so that ±1st-order diffracted lights are placed in order in the forward direction of tracking pits, detecting a difference between +1st- and −1st- diffracted light signals. When the microspot projected onto the optical disk 8 is out of a target track position, an error signal according to the amount of the eccentricity of the optical disk 8 is obtained. Thus, a control signal for canceling the error signal can be applied to the lens actuator to control the microspot to be on the target track position.

Next, another conventional optical head device with a collimator lens 14 will be explained in FIG. 2, wherein like parts are indicated by like reference numerals as used in FIG. 1.

When a signal is reproduced from the optical disk 8, light emitted from the semiconductor laser 9 is converted through the collimator lens 14 into collimated light. The collimated light is transmitted through the beam splitter 12a, then formed into a microbeam by the objective lens 10.

The microbeam is projected on the optical disk 8. When a microspot is projected on an information signal area so as to reproduce information recorded on the optical disk 8, the position control of the light beam against the plane pitching and eccentricity of the optical disk 8 is necessary.

Due to the plane pitching and eccentricity, the light beam converged to about 1 µm may be out of the information signal area. The objective lens 10, which is held by a lens actuator (not shown) movable in the directions of two axes for focusing and tracking, controls precisely the converged spot to be on the information signal area.

In the above optical information reproducing devices, the increase in recording capacity has been desired. Thus, in such a device, a light spot projected on an optical disk needs to be miniaturized to achieve a higher-density recording.

The size of the microspot on the optical disk depends upon a wavelength $\lambda$ of the laser and a numerical aperture (NA) of the objective lens. Therefore, in the current techniques, the size reduction of the projected spot is achieved by decreasing the wavelength $\lambda$ and increasing NA.

When a microspot is produced, the wavefront aberration of an optical part in optical head device, such as a semiconductor laser, diffraction grating, beam splitter and objective lens, affects directly the deterioration in the size of a microspot.

Namely, the wavefront aberration of each optical part deteriorates image formation characteristics of the optical head device. If the wavefront aberration of each optical part is big, a microspot diameter which is determined by NA of objective lens and a wavelength of semiconductor laser cannot be produced.

According to Marechal's criterion, it does not become less than 80% of an ideal convergence intensity characteristic when the total wavefront aberration of optical parts in an optical head image-formation system is less than 0.07 $\lambda$.

"Micro-Optics Handbook", Vol.5, p.625 reports general wavefront aberrations for optical parts in conventional optical head devices, i.e., 0.013 $\lambda$ for semiconductor lasers, 0.025 $\lambda$ for collimator lens, 0.012 $\lambda$ for diffraction gratings, 0.015 $\lambda$ for beam splitters, 0.03 $\lambda$ for objective lens, 0.05 $\lambda$ for optical disks and 0.025 $\lambda$ as adjustment part, whereby the total wavefront aberration of an optical head device is given by:

$$\sqrt{\frac{(0.013\lambda)^2 + (0.025\lambda)^2 + (0.012\lambda)^2 + (0.015\lambda)^2 +}{(0.03\lambda)^2 + (0.05\lambda)^2 + (0.025\lambda)^2}} = 0.072\lambda$$

In high-density optical disks, laser light may fail to diffract entering into a pit since the pit size becomes smaller than a wavelength of light source. If it fails to diffract, an information signal recorded on the optical disk cannot be reproduced because the information signal is reproduced converting into an electrical signal by using the diffraction of light projected on the pit. Namely, in case of high-density optical disks, an allowable criterion of total wavefront aberration of an optical head device must be further severer than 0.072 $\lambda$. Thus, an increase in wavefront aberration of optical parts will sensitively promote the deterioration of an information signal in high-density optical disks. Therefore, there occurs a problem that recording and reproducing may not be stably conducted.

Meanwhile, the numerical aperture (NA) of an objective lens in an optical head device becomes bigger so as to reproduce, particularly, a high-density optical disk. Therefore, a convergent beam on the recording surface of the optical disk becomes sensitive to a deterioration in aberration, and it is very difficult to obtain a desired convergent beam diameter. Namely, NA of objective lens has to be designed bigger to reproduce the high-density optical disk. In this case, a microspot diameter is designed at such a limit that the objective lens can diffract. Thus, even a little dispersion of wavefront aberration of the optical part causes a big variation in the shape of a convergent spot.

To this problem, several solutions have been conducted, for example, the performance test or production control of optical parts of an optical head device, such as an objective lens, is severely conducted. However, in the conventional solutions, there are problems that the optical head device produced is costly and that the production yield is lowered.

SUMMARY OF THE INVENTION

Accordingly, it is an object of the invention to provide an optical head device where a total wavefront aberration determined by all optical parts in its optical system is effectively reduced.

According to the invention, an optical head device for projecting a laser spot on an optical disk and reading out recorded information by detecting a recording state recorded on a recording surface of the optical disk, comprises:

a collimator lens which converges divergent light emitted from a semiconductor laser; and a pinhole member which removes a wavefront aberration at an outline portion of the light converged by the collimator lens;

wherein the collimator lens and the pinhole member are disposed in an image-forming optical system, where a microspot is produced, from the semiconductor laser as a light source to an objective lens, and a wavefront aberration of the semiconductor laser is removed to minimize a wavefront aberration of the image-forming optical system.

According to another aspect of the invention, an optical head device, comprises:

a first collimator lens which converges divergent light emitted from a semiconductor laser as a light source;

a pinhole member which removes a wavefront aberration at an outline portion of the light converged by the collimator lens; and a second collimator lens which converts light diverging again after passing through the pinhole member into collimated light.

According to still another aspect of the invention, an optical head device, comprises:

a first collimator lens which converges divergent light emitted from a semiconductor laser as a light source; and a pinhole member which removes a wavefront aberration at an outline portion of the converged light by the collimator lens;

wherein the pinhole member includes a pinhole disposed at a focal position of the light converged by first collimator lens, and the pinhole has a diameter to be 50% to 80% of a diameter of the converged light passing through the pinhole.

In the invention, the total wavefront aberration to be determined by all optical parts of an optical head device can be minimized, thereby giving stably a converged light spot at a diffraction limit produced by an objective lens with high NA. Thus, the performance of the high NA objective lens can be secured, thereby providing a high-capacity optical recording and reproducing device.

Meanwhile, in high-density optical disks, laser light may fail to diffract entering into a pit since the pit size becomes smaller than a wavelength of light source. If it fails to diffract, an information signal recorded on the optical disk cannot be reproduced because the information signal is reproduced converting into an electrical signal by using the diffraction of light projected on the pit. Namely, in case of high-density optical disks, an allowable criterion of total wavefront aberration of an optical head device must be further severer than 0.072 $\lambda$. Thus, an increase in wavefront aberration of optical parts will sensitively promote the deterioration of an information signal in high-density optical disks. Therefore, there occurs a problem that recording and reproducing may not be stably conducted.

Now, according to the invention, the total wavefront aberration, which is a typical criterion of Marechal, of optical parts in an image-forming optical system of an optical head device can be less than 0.07 $\lambda$.

Furthermore, in the invention, an optimumly designed microspot diameter at the diffraction limit of a high-NA objective lens can be cheaply secured even when using the high-NA objective lens which is sensitive to the deterioration of wavefront aberration. Namely, an optical head device of the invention can obtain the optimumly designed microspot diameter, without requiring a severe performance test or production control of optical parts of the optical head device, such as an objective lens.

BRIEF DESCRIPTION OF THE DRAWINGS

The invention will be explained in more detail in conjunction with the appended drawings, wherein.

DESCRIPTION OF THE PREFERRED EMBODIMENTS

An optical head device in the preferred embodiment will be explained in FIG. 3. FIG. 4 shows a shape of a pinhole member used in the optical system of the optical head device in the embodiment.

Figure 1:
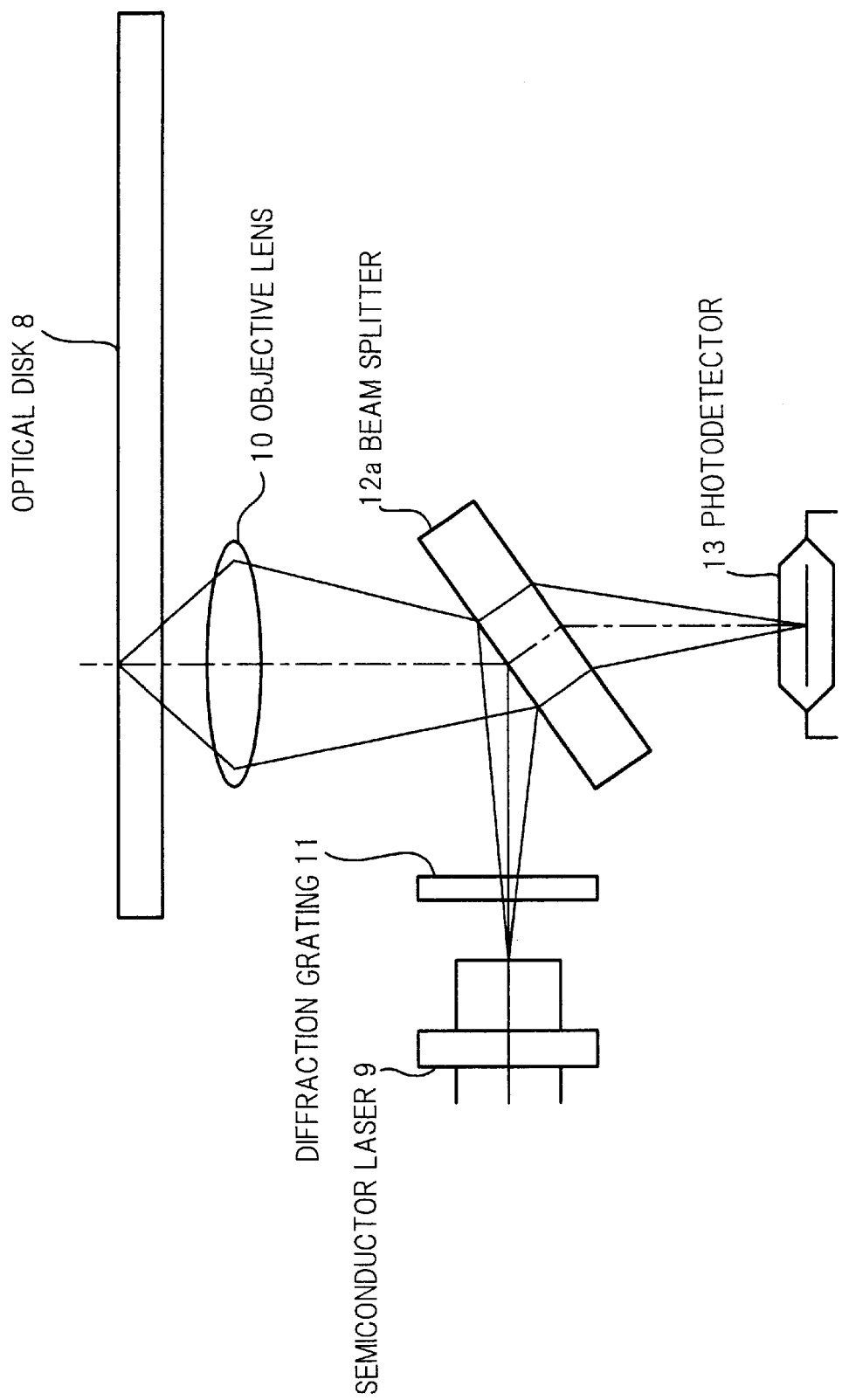
FIG. 1 is an illustration showing the optical system of a conventional optical head device.
Figure 2:
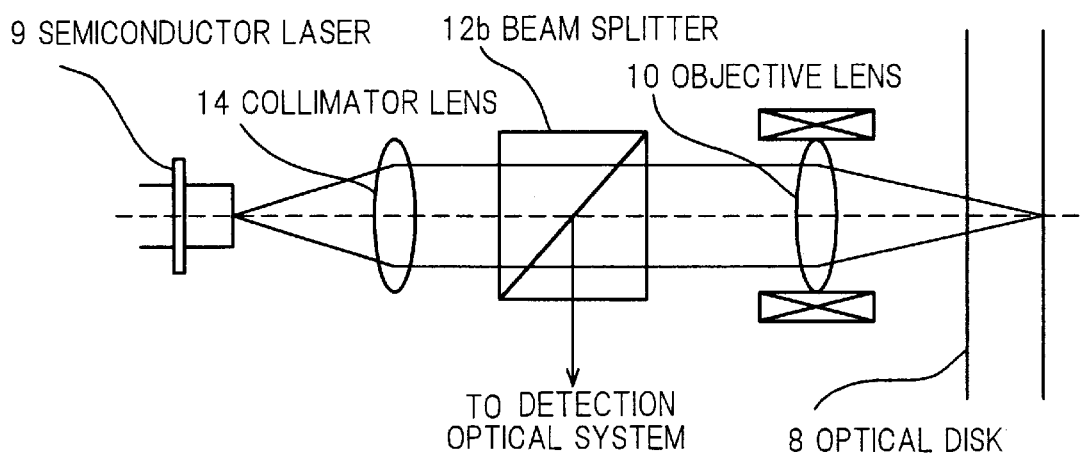
FIG. 2 is an illustration showing the optical system of another conventional optical head device using a collimator lens.
Figure 3:
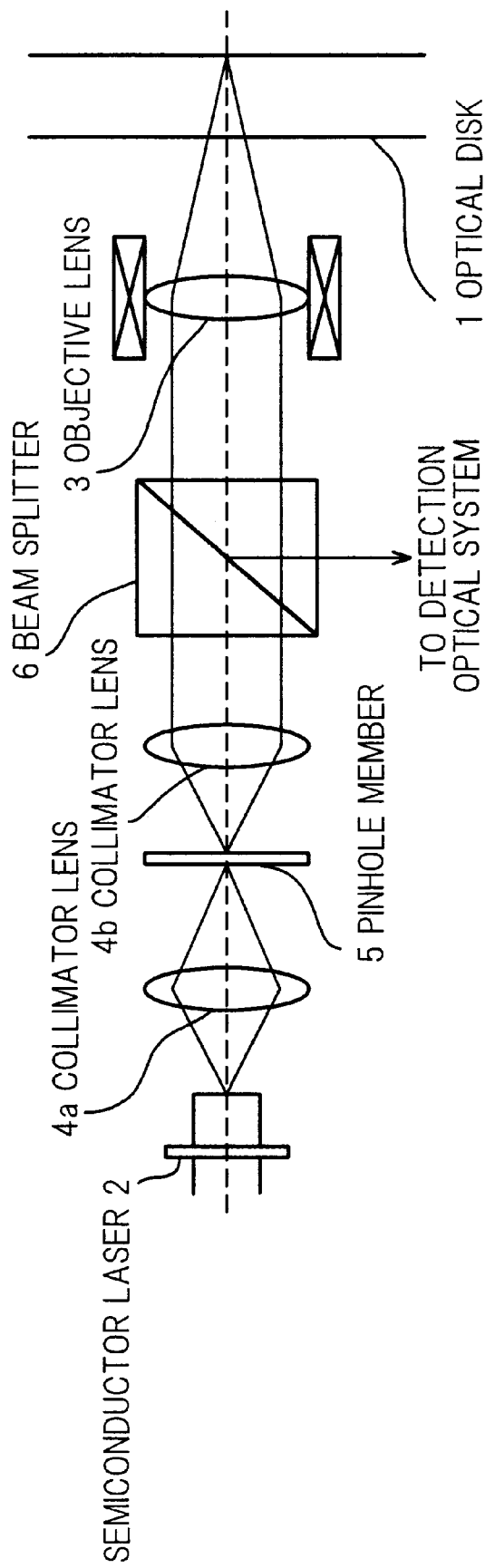
FIG. 3 is an illustration showing the optical system of an optical head device in a preferred embodiment according to the invention.
Figure 4:
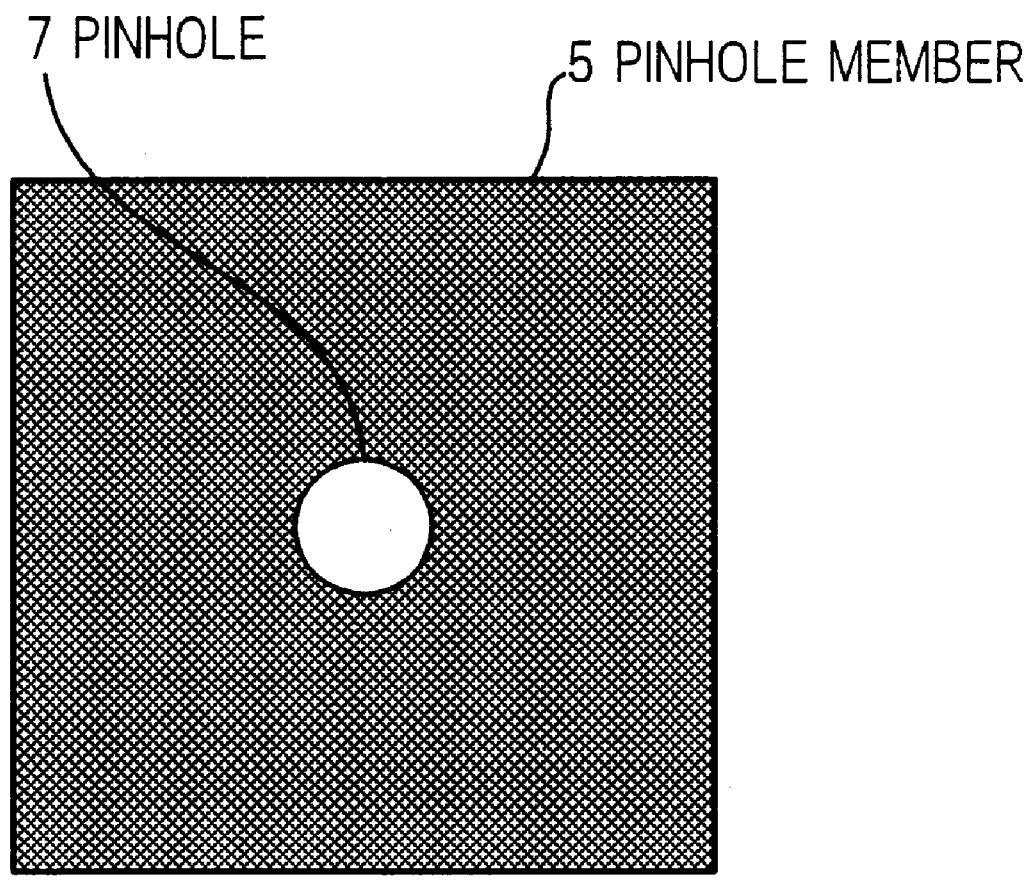
FIG. 4 is a plan view showing a pinhole member 5 in FIG. 3.

Referring to FIG. 3, in an image-forming optical system for producing a microspot from a semiconductor laser 2 to an objective lens 3, divergent light emitted from the semiconductor laser 2 is converged by a collimator lens 4a, then entering a pinhole 7 of the pinhole member 5 which is placed at the convergence point. The convergent light beam passes through the pinhole 7, diverging again, then entering a collimator lens 4b.

In fact, there exists the most wavefront aberration at the outline portion of a light beam, whereby the wavefront aberration of the optical system is deteriorated. By passing the convergent light through the pinhole 7, a light noise with much wavefront aberrations at the circumference light portion of the convergent beam can be removed. Thus, the wavefront aberration of the semiconductor laser 2 and collimator lens 4a disposed behind the pinhole 7 can be minimized.

As a result, the total wavefront aberration of the image-forming optical system can be minimized since the wavefront aberration resulting from the semiconductor laser 2 and collimator lens 4a can be removed. By minimizing the deterioration of wavefront aberration, the diameter of a microspot converged on an optical disk 1 can be a theoretical diameter to be determined by a wavelength of the semiconductor laser 2 and a numerical aperture of the objective lens 3. By employing the composition in this embodiment, the affection of an increase in spot diameter caused by a deterioration in wavefront aberration of the optical system can be removed, and the image-forming optical system with the optimum design value can be obtained.

Light reflected on the optical disk 1, where an information signal component recorded on the optical disk 1 is represented by optical intensities of diffracted light, returns to the objective lens 3, converted into collimated light, reflected by a beam splitter 6, thereby supplied to a signal detection optical system (not shown). The signal detection optical system is composed of focusing and tracking servo error detection optical systems for controlling a microspot to follow the plane pitching and eccentricity of the optical disk 1, and a reproduction signal detection system for detecting the information signal. The focusing servo error detection optical system can be composed by using a typical astigmatism or spot size method, and the tracking servo error detection optical system can be composed by using a typical push-pull or phase difference method. Also, the reproduction signal detection system can be cheap composed by using either or both of the above detection optical systems.

FIG. 4 shows an example of a shape of the pinhole member 5. The pinhole 7 may be a circular aperture. The pinhole 7 is disposed at the focal position where the convergent light emitted from the semiconductor laser 2 is converged by the collimator lens 4a. The diameter of the pinhole 7 is designed to be 50% to 80% of the diameter of light beam passing through the pinhole 7 so as to remove the wavefront aberration at the outline portion of the convergent light. When the diameter of the pinhole 7 is less than 50%, the optical efficiency in the entire optical head device is reduced, therefore unfit for the recording and reproducing. When the diameter of the pinhole 7 is designed to be greater than 80%, the removal of wavefront aberration from light beam is impossible. The pinhole member 5 can be cheaply fabricated by patterning an aperture portion and a shade portion on a typical glass plate.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. An optical head device for projecting a laser spot on an optical disk and reading out recorded information by detecting a recording state recorded on a recording surface of said optical disk, comprising:

a collimator lens which converges a divergent monochromatic light beam emitted from a semiconductor laser; and a pinhole member which removes a wavefront aberration at an outline portion of said monochromatic light beam converged by said collimator lens, said pinhole member including a pinhole having a diameter within a range of about 50% to 80% of a diameter of said monochromatic light beam striking said pinhole member;

wherein said collimator lens and said pinhole member are disposed in an image-forming optical system, where a microspot is produced from said semiconductor laser as a monochromatic light source and is transmitted to an objective lens, and a wavefront aberration of said semiconductor laser is removed by said pinhole member to minimize a wavefront aberration of said image-forming optical system.

2. An optical head device, comprising:

a first collimator lens which converges divergent monochromatic light beam emitted from a semiconductor laser as a monochromatic light source;

a pinhole member which removes a wavefront aberration at an outline portion of said monochromatic light beam converged by said collimator lens, said pinhole member including a pinhole having a diameter within a range of about 50% to 80% of a diameter of said monochromatic light beam striking said pinhole member; and a second collimator lens which converts said monochromatic light beam, diverging again after passing through said pinhole member, into a collimated monochromatic light beam.

3. An optical head device, comprising:

a collimator lens which converges a divergent monochromatic light beam emitted from a semiconductor laser as a monochromatic light source; and a pinhole member which removes a wavefront aberration at an outline portion of said converged monochromatic light beam by said collimator lens;

wherein said pinhole member includes a pinhole disposed at a focal position of said monochromatic light beam converged by said collimator lens, wherein said pinhole has a diameter within a range of about 50% to 80% of a diameter of said converged monochromatic light beam striking said pinhole member.

* * * * *